(12) United States Patent
Romani et al.

(10) Patent No.: US 7,488,004 B1
(45) Date of Patent: Feb. 10, 2009

(54) SWIVELABLE VACUUM HOSE COUPLER OF A GROOMING CLIPPER VACUUM ATTACHMENT

(75) Inventors: R. Marlene Romani, Indiana, PA (US); Domenic A. Romani, Indiana, PA (US)

(73) Assignee: M.D.C. Romani, Inc., Indiana, PA (US)

( * ) Notice: Subject to any disclaimer, the term of this patent is extended or adjusted under 35 U.S.C. 154(b) by 1050 days.

(21) Appl. No.: 10/402,587

(22) Filed: Mar. 28, 2003

(51) Int. Cl.
F16L 27/00 (2006.01)
F16L 27/08 (2006.01)
B25F 3/00 (2006.01)

(52) U.S. Cl. .............. 285/278; 285/275; 285/280; 285/7; 30/124; 30/132; 30/133

(58) Field of Classification Search .......... 285/7, 285/272, 275, 278, 280; 30/123, 124, 132, 30/133
See application file for complete search history.

(56) References Cited

U.S. PATENT DOCUMENTS

| | | | | |
|---|---|---|---|---|
| 1,366,381 A * | 1/1921 | Gullborg | ............ | 285/101 |
| 1,883,509 A * | 10/1932 | Boone | ............ | 285/187 |
| 1,903,395 A * | 4/1933 | Crowley | ............ | 152/430 |
| 2,177,740 A * | 10/1939 | Orndorff et al. | ............ | 285/36 |
| 2,233,471 A | 3/1941 | Clements | ............ | 285/97.1 |
| 3,167,330 A | 1/1965 | Draudt | ............ | 285/7 |
| 3,331,130 A * | 7/1967 | Ligon | ............ | 30/133 |
| 4,083,077 A * | 4/1978 | Knight et al. | ............ | 15/321 |
| 4,099,744 A * | 7/1978 | Kutnyak et al. | ............ | 285/7 |
| 4,152,017 A * | 5/1979 | Abramson | ............ | 285/260 |
| 4,345,805 A | 8/1982 | Finley et al. | ............ | 339/16 R |
| 4,625,998 A | 12/1986 | Draudt et al. | ............ | 285/7 |
| 4,695,079 A * | 9/1987 | Weinhold | ............ | 285/278 |
| 4,913,471 A | 4/1990 | Huneke | ............ | 285/284 |
| 4,998,317 A * | 3/1991 | Passien | ............ | 15/321 |
| 5,088,199 A * | 2/1992 | Romani | ............ | 30/133 |
| 5,153,994 A | 10/1992 | Emmett | ............ | 30/133 |
| 5,457,271 A | 10/1995 | Aulson | ............ | 588/249 |
| 5,461,783 A * | 10/1995 | Henderson | ............ | 30/124 |
| 5,551,731 A | 9/1996 | Gray et al. | ............ | 285/7 |
| 5,924,202 A * | 7/1999 | Romani | ............ | 30/133 |
| 6,308,994 B1 * | 10/2001 | Eidsmore | ............ | 285/279 |
| 6,540,265 B2 * | 4/2003 | Turk | ............ | 285/384 |
| 6,571,478 B1 * | 6/2003 | Romani et al. | ............ | 30/133 |

* cited by examiner

*Primary Examiner*—James M. Hewitt
(74) *Attorney, Agent, or Firm*—Arnold B. Silverman; Eckert Seamans Cherin & Mellott, LLC

(57) ABSTRACT

A swivelable vacuum hose coupler of a grooming clipper vacuum attachment includes a front attachment member attachable to a suction head of the vacuum attachment, a rear hose attachment member attachable to an end of a vacuum hose, and an annular swivel collar rigidly attached to a rear end portion of the front attachment member and rotatably coupled to a front end portion of the rear attachment member so as to hold the rear end portion of the front attachment member in an abutting relationship with the front end portion of the rear attachment member and the front attachment member in flow communication with the rear attachment member and to form a swivel joint with the rear attachment member such that the front attachment member can rotate at the swivel joint relative to the rear attachment member and thereby allow the rear attachment member to remain in a stationary position relative to the front attachment member.

22 Claims, 2 Drawing Sheets

SWIVELABLE VACUUM HOSE COUPLER OF A GROOMING CLIPPER VACUUM ATTACHMENT

BACKGROUND OF THE INVENTION

1. Field of the Invention

The present invention generally relates to hair grooming clipper attachments and, more particularly, is concerned with a swivelable vacuum hose coupler of a grooming clipper vacuum attachment.

2. Description of the Prior Art

One of the main concerns of a professional dog groomer is the breathing of fine dog hair and dander into the lungs. This can be a serious problem, as hair does not dissolve, instead it accumulates. This can cause hair balls and hair emphysema. These small sharp hairs can also become embedded into the groomer's skin and must be removed before they enter tissue or the blood stream. The breathing or assimilation of fleas, ticks and their eggs and larva is another major problem. Parasites are very detrimental and destructive to both animals and humans.

To obviate these problems, vacuum systems are often employed with hair grooming clippers. Typically, as disclosed in U.S. Pat. No. 5,088,199 assigned to MDC Romani Inc. of. Indiana, Pa., also the assignee of the present invention, such vacuum systems may have a vacuum attachment which includes a suction head, a hollow hose coupler and a flexible hose. The suction head is attached to the hand-held clipper adjacent to its cutting head and is connected via the hollow hose coupler to one end of the flexible hose. The other end of the hose is connected directly or via an intermediate conduit to a vacuum generating unit for creating a vacuum condition in the hose. The vacuum condition draws air into the hose through the suction head and hose coupler, entraining hair cuttings in the air flow through the hose to the vacuum generating unit where the hair cuttings are collected, typically, in a container.

The above-described vacuum systems have generally improved the cleanliness of grooming shops, reduced the potential hazards to grooming personnel from breathing in hair cuttings and other matter, and made grooming easier. However, from time to time a need arises to make certain improvements which will solve other problems that crop up and improve performance and productivity even further.

One problem, as recognized by the inventors herein, arises during a typical grooming operation. As the clipper and thus the suction head and hose coupler therewith are rotated and moved about, the vacuum hose is also rotated and moved about therewith which causes the vacuum hose to tangling about itself.

Consequently, a need has arisen for an innovation that will solve the aforementioned problem without introducing any new problem in place thereof.

SUMMARY OF THE INVENTION

The present invention provides a swivelable vacuum hose coupler which is designed to satisfy the aforementioned need. The swivelable coupler of the present invention is fixedly attached to the suction head and to the end of the vacuum hose the same as heretofore but now incorporates a swivel joint which allows a rear hose attachment member of the coupler and the end of the hose fixedly connected thereto to remain in a stationary position as the clipper and thus the suction head and a front suction head attachment member of the coupler are rotated and moved about with the clipper during the typical grooming operation. The incorporation of the swivel joint in the coupler now prevents the hose from entangling about itself as in the case of the prior art unit.

Accordingly, the present invention is directed to a swivelable vacuum hose coupler of a grooming clipper vacuum attachment. The swivelable vacuum hose coupler of a grooming clipper vacuum attachment. The coupler comprises: (a) a front attachment member of hollow construction being attachable to a suction head of a grooming clipper vacuum attachment; (b) a rear hose attachment member of hollow construction being attachable to an end of a vacuum hose; and (c) an annular swivel collar of hollow construction being rigidly attached to a rear end portion of the front attachment member and rotatably coupled to a front end portion of the rear attachment member so as to hold the rear end portion of the front attachment member in an abutting relationship with the front end portion of the rear attachment member and the front attachment member in flow communication with the rear attachment member and to form a swivel joint with the rear attachment member such that the front attachment member can rotate at the swivel joint relative to the rear attachment member and thereby allow the rear attachment member to remain in a stationary position relative to the front attachment member. The rear end portion of the front attachment member has an annular boss and a rear annular surface defined on the annular boss. The front end portion of the rear attachment member has an annular flange projecting outwardly therefrom and a front annular surface defined on the annular flange and disposed in the abutting relationship with the rear annular surface of the annular boss on the front attachment member. The swivel collar has an outer tubular portion with opposite front and rear ends and an annular inner rim attached to and projecting inwardly from the rear end of the outer tubular portion. The outer tubular portion of the swivel collar is disposed over and fixedly attached to the boss of the front attachment member. The annular inner rim of the swivel collar is disposed in an abutting relationship with a rear annular surface on the annular flange of the rear attachment member which is disposed opposite from the abutting relationship of the front annular surface of the annular flange with the rear annular surface of the boss on the front attachment member. The flange on the rear attachment member has an external diameter is less than an internal diameter of the outer tubular portion of the swivel collar such that an annular gap exists between the outer tubular portion of the swivel collar and the flange to thereby allow the collar and the front attachment member therewith to rotate about the flange and the rear attachment therewith and form the swivel joint therewith.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
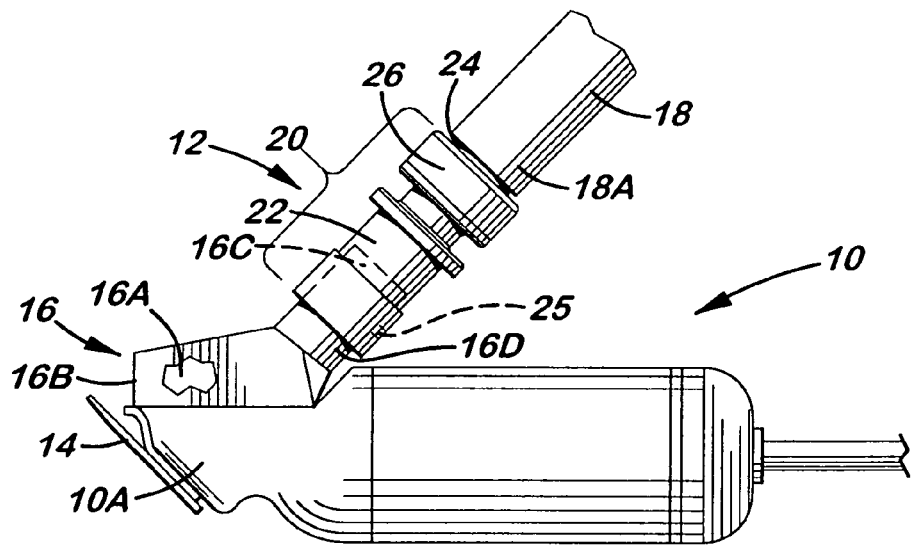
FIG. 1 is a side elevational view of a conventional handheld hair clipper and a vacuum attachment mounted thereto, the vacuum attachment having a suction head mounted on the clipper and a vacuum hose rotatably connected to the suction head by a swivelable vacuum hose coupler of the present invention.
Figure 2:
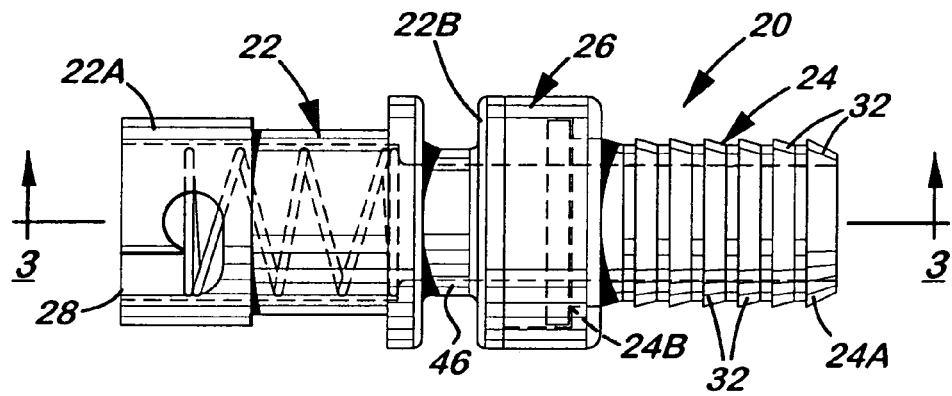
FIG. 2 is an enlarged side elevational view of the coupler of FIG. 1 by itself.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring to the drawings and particularly to FIG. 1, there is illustrated a conventional hand-held electric hair grooming clipper 10 and a vacuum attachment 12 secured thereto. The vacuum attachment 12 is mounted on a cutting head end 10A of the clipper 10 which has clipper cutting blades 14 thereon. The vacuum attachment 12 includes a vacuum or suction head 16, a vacuum hose 18 which leads to a source of vacuum (not shown), and a swivelable coupler 20 of the present invention which releasably connects the suction head 16 in communication with an end 18A of the hose 18.

When the suction head 16 is installed on the cutting head end 10A of the clipper 10, the clipper 10 closes an open bottom of the suction head 16. A vacuum applied to the suction head 16 through the vacuum hose 18 will now induce a flow of air through an air flow passage 16A of the suction head 16 from a front inlet 16B to a rear outlet 16C thereof and from the rear outlet 16C through the hollow swivelable coupler 20 to the vacuum hose 18.

It can be readily understood that during a typical grooming operation as hair is cut by the clipper 10, the loose hair cuttings will be sucked into the suction head 16 through its front inlet 16B located immediately rearward of the cutting blades 14. The hair cuttings will be entrained in the flow of air travelling rearward through the air flow passage 16A to the vacuum hose 18. Although not shown, as well-known in the art, the hair cuttings will be deposited from the vacuum hose 18 into a collection container.

Referring to FIGS. 2-8, there is illustrated in assembled form the swivelable vacuum hose coupler 20 of the present invention. The swivelable coupler 20 basically has an overall elongated hollow tubular construction and includes a hollow front suction head attachment member 22, a hollow rear hose attachment member 24 and a hollow annular swivel collar 26 for holding the front attachment member 22 in flow communication with the rear attachment member 24 and such that the front attachment member 22 can rotate relative to the rear attachment member 24. The front attachment member 22 inserts over a rear connector tube 16D of the suction head 16 and has a front end portion 22A provided with a slot 28 that receives and interengages a pin 25 projecting from a lower side of the rear connector tube 16D of the suction head 16 to provide a fixed, but releasable, bayonet-type connection between the front attachment member 22 of the swivelable coupler 20 and the rear connector tube 16D of the suction head 16. The front attachment member also has a rear end portion 22B provided with an enlarged annular boss 30.

The rear attachment member 24 has a rear end portion 24A provided with a series of external circumferential serrations 32 for receiving thereover and attaching thereto the one end 18A of the vacuum hose 18. The rear attachment member 24 also has a front end portion 24B provided with an annular flange 34 projecting outwardly from the front end portion 24B. The annular flange 34 has a front annular surface 34A disposed in an abutting relationship with a rear annular surface 30A of the annular boss 30 on the front attachment member 22.

The annular swivel collar 26 is employed to retain the annular flange 34 of the rear attachment member 24 in the abutting relationship with the annular boss 30 on the front attachment member 22 and at the same time form a swivel joint 36 that permits relative swivel or rotation between the front and rear attachment members 22, 24 of the swivelable coupler 20. The swivel collar 26 has an outer tubular portion 38 with opposite front and rear ends 38A, 38B and an annular inner rim 40 attached to and projecting inwardly from the rear end 38B of the outer tubular portion 38.

During assembly, the swivel collar 26 is first slid over the rear end portion 24A of the rear attachment member 24 and then moved therealong toward the front end portion 24B of the rear attachment member 24 until the annular inner rim 40 of the collar 26 is brought into an abutting relationship with a rear annular surface 34B on the annular flange 34 of the rear attachment member 24 which is disposed opposite from the front annular surface 34A of the annular flange 34 disposed in the abutting relationship with the rear annular surface 30A of the annular boss 30 on the front attachment member 22. The one end 18A of the vacuum hose 18 is then slid over the series of serrations 32 on the rear end portion 24A of the rear attachment member 24 and is fixed thereto by application of glue or by clamping. The rear attachment member 24 is then brought into alignment with the front attachment member 22 so that the rear annular surface 30A of the annular boss 30 on front attachment member 22 abuts and joins the front annular surface 34A of the annular flange 34 on the rear attachment member 24. The swivel collar 26 is positioned such that its outer tubular portion 38 overlies the annular boss 30 and abuts an outer flange 42 thereon. In such position, the outer tubular portion 38 of the collar 26 can either be welded to the boss 30, glued to the boss 30 or the outer tubular portion 38 of the swivel collar 26 can have internal threads 38C which threadably secure with external threads 30A provided about the boss 30 for fixedly securing the collar 26 on the boss 30 of the front attachment member 22.

Figure 3:
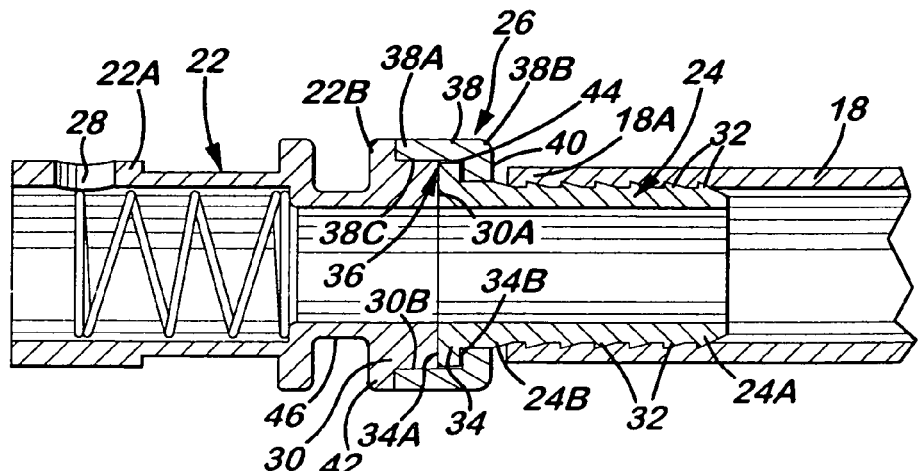
FIG. 3 is a longitudinal sectional view of the coupler taken along line 3-3 of FIG. 2, also showing an end of the vacuum hose attached over a rear hose attachment member of the coupler and a coil spring within a front suction head attachment member of the coupler.
Figure 4:
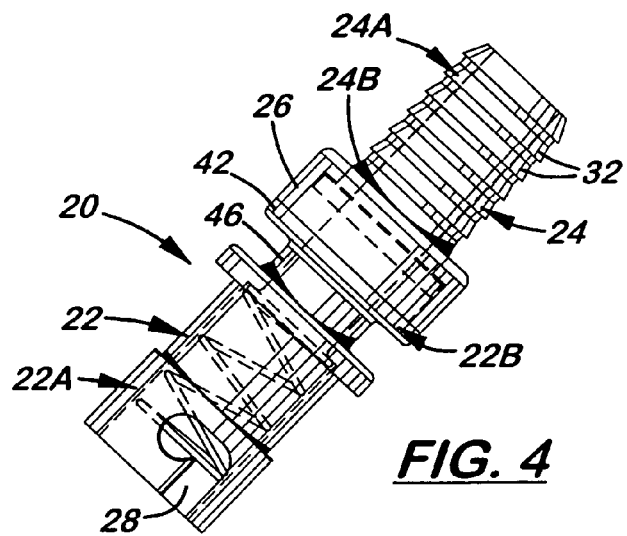
FIG. 4 is a perspective view of the coupler of FIG. 2.
Figure 5:
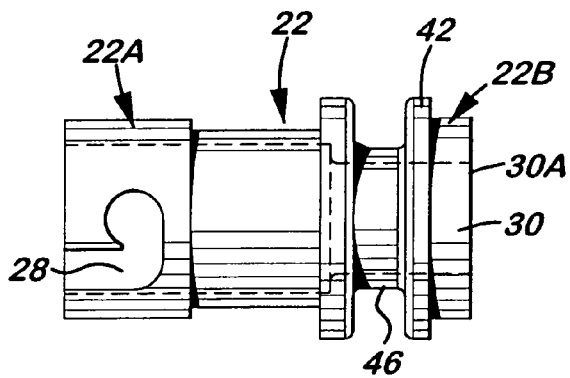
FIG. 5 is a side elevational view of the front suction head attachment member of the coupler of FIG. 4 by itself.
Figure 7:
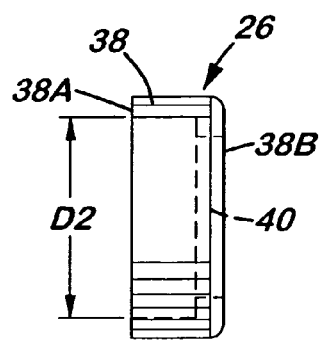
FIG. 7 is a side elevational view of a swivel collar of the coupler of FIG. 4 by itself.
Figure 6:
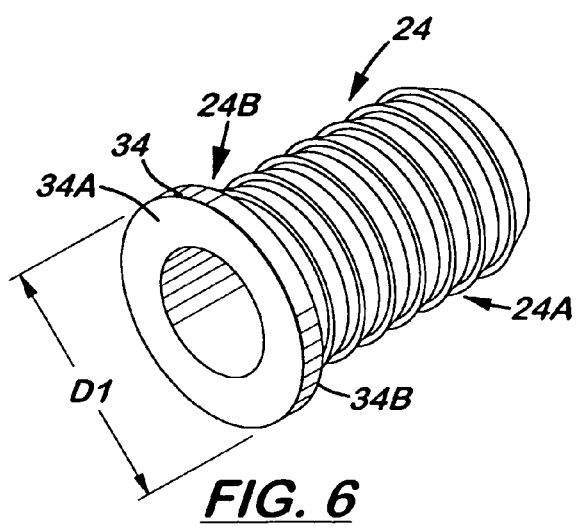
FIG. 6 is a perspective view of the rear hose attachment member of the coupler of FIG. 4 by itself.
Figure 8:
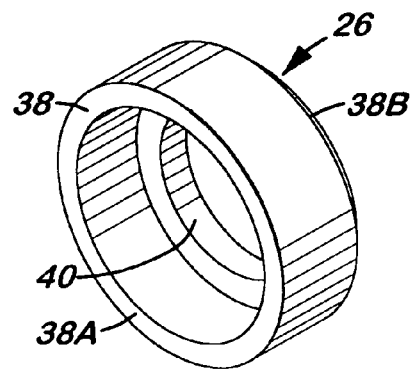
FIG. 8 is a perspective view of the collar of FIG. 7.

As seen in FIG. 3, the external diameter D1 of the annular flange 34 on the rear attachment member 24 is slightly less than the internal diameter D2 of the outer tubular portion 38 of the collar 26 such that a small annular clearance or gap 44 exists therebetween and around the annular flange 34 which thereby allows the annular flange 34, and therewith the rear attachment member 24, to rotate within the annular swivel collar 26 which is now fixed to the front attachment member 22 and thereby form the swivel joint 36 that permits the relative swivel or rotation between the front and rear attachment members 22, 24 of the swivelable coupler 20. It can be readily understood that the swivel joint 36 of the swivelable coupler 20 of the present invention eliminates tangling of the vacuum hose 18 about itself during rotating and moving about of the clipper 10 and suction head 12 therewith during a typical grooming operation. The swivel joint 36 incorporated by the coupler 20 allows the rear hose attachment member of the coupler 10 and the end of the hose 18 to be fixedly connected together and to substantially remain in a stationary position as the clipper 10 and thus the suction head 12 and the front attachment member 22 of the coupler 20 fixed thereon are rotated and moved with the clipper 10.

Also, the swivelable coupler 20 of the present invention also includes an annular recess 46 provided in the front attachment member 22 adjacent to the boss 30. The annular recess 46 extends completely around the front attachment member 22 of the coupler 20 and serves as a catch for attaching to a hook on a wall for hanging the clipper 10 and hose 14 in a storage out-of-way location.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A swivelable vacuum hose coupler of a grooming clipper vacuum attachment, said coupler comprising:
   (a) a front attachment member of hollow construction attachable to a suction head of a grooming clipper vacuum attachment;
   (b) a rear hose attachment member of hollow construction attachable to an end of a vacuum hose; and
   (c) an annular swivel collar of hollow construction rigidly attached to a rear end portion of said front attachment member and rotatably coupled to a front end portion of said rear attachment member so as to hold said rear end portion of said front attachment member in an abutting relationship with said front end portion of said rear attachment member and said front attachment member in flow communication with said rear attachment member and to form a swivel joint with said rear attachment member such that said front attachment member can rotate at said swivel joint relative to said rear attachment member and thereby allow said rear attachment member to remain in a stationary position relative to the front attachment member.

2. The coupler as recited in claim 1, wherein said front attachment member is insertable over a rear connector tube of the suction head and has a front end portion with a slot defined therein that receives and interengages a pin projecting from the rear connector tube of the suction head to provide a releasable bayonet-type connection between said front attachment member and the rear connector tube of the suction head.

3. The coupler as recited in claim 1, wherein a rear end portion of said rear attachment member has a series of external circumferential serrations for receiving thereover and attaching thereto the end of the vacuum hose.

4. The coupler as recited in claim 1, wherein:
   said rear end portion of said front attachment member has an annular boss and a rear annular surface defined on said annular boss; and
   said front end portion of said rear attachment member has an annular flange projecting outwardly therefrom and a front annular surface defined on said annular flange and disposed in said abutting relationship with said rear annular surface of said annular boss on said front attachment member.

5. The coupler as recited in claim 4, wherein said swivel collar has an outer tubular portion with opposite front and rear ends and an annular inner rim attached to and projecting inwardly from said rear end of said outer tubular portion, said outer tubular portion of said swivel collar being disposed over and fixedly attached to said boss of said front attachment member, said annular inner rim of said swivel collar being disposed in an abutting relationship with a rear annular surface on said annular flange of said rear attachment member which is disposed opposite from said front annular surface of said annular flange in said abutting relationship with said rear annular surface of said boss on said front attachment member.

6. The coupler as recited in claim 5, wherein said outer tubular portion of said swivel collar overlying said annular boss also abuts an outer flange on said annular boss.

7. The coupler as recited in claim 5, wherein said outer tubular portion of said swivel collar is welded to said annular boss.

8. The coupler as recited in claim 5, wherein said outer tubular portion of said swivel collar is glued to said annular boss.

9. The coupler as recited in claim 5, wherein said annular boss has external threads and said outer tubular portion of said swivel collar has internal threads which are received over and threadably secured with said external threads on said boss.

10. The coupler as recited in claim 5, wherein said annular flange on said rear attachment member has an external diameter less than an internal diameter of said outer tubular portion of said swivel collar such that an annular gap exists between said outer tubular portion of said swivel collar and said annular flange to thereby allow said collar and said front attachment member therewith to rotate about said annular flange and said rear attachment therewith and form said swivel joint therewith.

11. The coupler as recited in claim 5, wherein said rear end portion of said front attachment member has an annular recess defined therein adjacent to said boss which extends around said front attachment member and serves as a catch for hanging the clipper and hose in a location.

12. A vacuum attachment for mounting on a hair grooming clipper, comprising:
   (a) a suction head adapted to mount on a cutting head end of a clipper and having a rear connector tube;
   (b) a vacuum hose for connecting to a source of vacuum; and
   (c) a swivelable coupler releasably connecting said rear connector tube of said suction head in communication with an end of said vacuum hose, said swivelable coupler including
      (i) a front attachment member of hollow construction attachable to a suction head of a grooming clipper vacuum attachment,
      (ii) a rear attachment member of hollow construction attachable to an end of a vacuum hose, and
      (iii) an annular swivel collar of hollow construction rigidly attached to a rear end portion of said front attachment member and rotatably coupled to a front end portion of said rear attachment member so as to hold said rear end portion of said front attachment member in an abutting relationship with said front end portion of said rear attachment member and said front attachment member in flow communication with said rear attachment member and to form a swivel joint with said rear attachment member such that said front attachment member can rotate at said swivel joint relative to said rear attachment member and thereby allow said rear attachment member to remain in a stationary position relative to the front attachment member.

13. The attachment as recited in claim 12, wherein said front attachment member is insertable over said rear connector tube of said suction head and has a front end portion with a slot defined therein that receives and interengages a pin projecting from said rear connector tube of said suction head to provide a releasable bayonet-type connection between said front attachment member and said rear connector tube of said suction head.

14. The attachment as recited in claim 12, wherein a rear end portion of said rear attachment member has a series of external circumferential serrations for receiving thereover and attaching thereto of said end of said vacuum hose.

15. The attachment as recited in claim 12, wherein:
said rear end portion of said front attachment member has an annular boss and a rear annular surface defined on said annular boss; and
said front end portion of said rear attachment member has an annular flange projecting outwardly therefrom and a front annular surface defined on said annular flange and disposed in said abutting relationship with said rear annular surface of said annular boss on said front attachment member.

16. The attachment as recited in claim 15, wherein said swivel collar has an outer tubular portion with opposite front and rear ends and an annular inner rim attached to and projecting inwardly from said rear end of said outer tubular portion, said outer tubular portion of said swivel collar being disposed over and fixedly attached to said boss of said front attachment member, said annular inner rim of said swivel collar being disposed in an abutting relationship with a rear annular surface on said annular flange of said rear attachment member which is disposed opposite from said front annular surface of said annular flange disposed in said abutting relationship with said rear annular surface of said boss on said front attachment member.

17. The attachment as recited in claim 16, wherein said outer tubular portion of said swivel collar overlying said annular boss also abuts an outer flange on said annular boss.

18. The attachment as recited in claim 16, wherein said outer tubular portion of said swivel collar is welded to said annular boss.

19. The attachment as recited in claim 16, wherein said outer tubular portion of said swivel collar is glued to said annular boss.

20. The attachment as recited in claim 16, wherein said annular boss has external threads and said outer tubular portion of said swivel collar has internal threads which are received over and threadably secured with said external threads on said annular boss.

21. The attachment as recited in claim 16, wherein said flange on said rear attachment member has an external diameter less than an internal diameter of said outer tubular portion of said swivel collar such that an annular gap exists between said outer tubular portion of said swivel collar and said flange to thereby allow said collar and said front attachment member therewith to rotate about said flange and said rear attachment therewith and form said swivel joint therewith.

22. The attachment as recited in claim 16, wherein said rear end portion of said front attachment member has an annular recess defined therein adjacent to said annular boss which extends around said front attachment member and serves as a catch for hanging the clipper and hose in a location.

* * * * *